US011066050B2

(12) United States Patent
Fazio et al.

(10) Patent No.: US 11,066,050 B2
(45) Date of Patent: Jul. 20, 2021

(54) ROTATING SIDE BRUSH WITH A FOUR BAR LINKAGE FOR AN AUTOMATED CARWASH AND METHOD OF OPERATING THE AUTOMATED CARWASH

(71) Applicant: SONNY'S ENTERPRISES, LLC, Tamarac, FL (US)

(72) Inventors: Paul Fazio, Tamarac, FL (US); Anthony Analetto, Weston, FL (US); David Guzman, Tamarac, FL (US)

(73) Assignee: Sonny's Enterprises, LLC, Tamarac, FL (US)

( * ) Notice: Subject to any disclaimer, the term of this patent is extended or adjusted under 35 U.S.C. 154(b) by 103 days.

(21) Appl. No.: 16/251,395

(22) Filed: Jan. 18, 2019

(65) Prior Publication Data

US 2020/0231129 A1 Jul. 23, 2020

(51) Int. Cl.
*B60S 3/06* (2006.01)
*A46B 13/00* (2006.01)
*A46B 13/02* (2006.01)

(52) U.S. Cl.
CPC ............ *B60S 3/063* (2013.01); *A46B 13/005* (2013.01); *A46B 13/02* (2013.01); *A46B 2200/3046* (2013.01)

(58) Field of Classification Search
CPC . B60S 3/06; B60S 3/063; A46B 13/02; A46B 13/005; A46B 2200/3046
See application file for complete search history.

(56) References Cited

U.S. PATENT DOCUMENTS

| 3,035,293 | A | | 5/1962 | Larson | |
|---|---|---|---|---|---|
| 3,292,192 | A | | 12/1966 | Maxwell | |
| 3,304,565 | A | * | 2/1967 | Fuhring | B60S 3/06 15/53.2 |
| 3,579,700 | A | * | 5/1971 | Haley | B60S 3/063 15/53.2 |
| 3,708,816 | A | * | 1/1973 | Napoli | B60S 3/063 15/53.2 |
| 3,777,326 | A | * | 12/1973 | Haley | B60S 3/063 15/53.3 |
| 3,794,929 | A | | 2/1974 | Carr | |
| 3,914,818 | A | * | 10/1975 | Fromme | B60S 3/06 15/97.3 |
| 3,989,390 | A | | 11/1976 | Thorner | |
| 4,608,726 | A | * | 9/1986 | Hanna | B60S 3/063 15/53.3 |
| 7,347,213 | B2 | | 3/2008 | Messing | |
| 2007/0174981 | A1 | | 8/2007 | Smith et al. | |
| 2015/0274137 | A1 | | 10/2015 | Belanger et al. | |

FOREIGN PATENT DOCUMENTS

| CN | 205417547 U | 8/2016 |
|---|---|---|
| EP | 2243672 A1 | 10/2010 |
| JP | 2004123091 A | 4/2004 |

* cited by examiner

*Primary Examiner* — Randall E Chin
(74) *Attorney, Agent, or Firm* — Laurence A. Greenberg; Werner H. Stemer; Ralph E. Locher

(57) ABSTRACT

A carwash station receives a vehicle being conveyed in a direction of travel in a carwash having a ground pathway. The carwash station includes a frame supported by the ground pathway, a four-bar linkage attached to the frame and a side washing brush attached to the four-bar linkage and having an axis of rotation being perpendicular to the direction of travel and perpendicular to the ground pathway.

10 Claims, 3 Drawing Sheets

US 11,066,050 B2

ROTATING SIDE BRUSH WITH A FOUR BAR LINKAGE FOR AN AUTOMATED CARWASH AND METHOD OF OPERATING THE AUTOMATED CARWASH

BACKGROUND OF THE INVENTION

Field of the Invention

The invention relates, generally, to rotating side brushes for automated carwashes and specifically to a rotating side brush supported by a four-bar-linkage.

In automatic drive-through carwashes, a vehicle is conveyed, by means of a conveyor drive, along a conveying stretch between wash-stations arranged along the conveying stretch. At these wash-stations horizontally oriented overhead rotating cleaning brushes principally impact a hood, roof areas of the vehicle, as well as the trunk of the vehicle. The axis of rotation of the horizontal brushes is parallel to the ground and perpendicular to the direction of conveyance of the vehicle. Such overhead rotating brushes are known in U.S. Pat. No. 7,347,213 to Messing where the overhead rotating brush is oriented horizontally and supported by a four-bar link needing counterweights, see FIGS. 1 and 2 of Messing.

Additionally, at these wash stations are vertically oriented side brushes for washing the front, sides and rear portions of a vehicle. These vertically oriented side brushes are supported by a single bar link and rotate about the vertical axis which is perpendicular to a direction of travel of the vehicle and perpendicular to the ground. U.S. patent publication No. 2007/0174981 to Smith et al. teaches such a side brush, see FIG. 1 of Smith. The single bar link supporting the side brushes allow a side brush to swing in a circular pattern to and from an approaching vehicle. Single bar links have been solely used for attaching the side brushes to a carwash bay since the inception of automatic carwashes as they are robust, reliable, and inexpensive.

As the vehicle travels through a carwash tunnel in a feed direction, it will traverse by the multiple rotating side brushes which contact the vehicle surfaces. As the vehicle travels in the feed direction, it pushes the side brushes and the axis of rotation moves along a known path. The side brushes rotate about an axis which is perpendicular to a feed direction and perpendicular to the ground and pivot about a single point. The single pivot point can be moving or stationary. These known side brushes follow a radial (e.g. circular) travel path.

However, single bar links limit the rotational pattern of the side brush to that of a circular arc and require an area of usage defined by the circular arc.

SUMMARY OF THE INVENTION

It is accordingly an object of the invention to provide a rotating side brush for an automated carwash supported by a four-bar-linkage that overcomes the herein-mentioned disadvantages of the heretofore-known devices and methods of this general type, which require less operational space and provide more surface area contact to parts of a passing vehicle.

With the foregoing and other objects in view there is provided, in accordance with the invention, a carwash station for receiving a vehicle being conveyed in a direction of travel in a carwash having a ground pathway. The carwash station includes a frame supported by the ground pathway, a four-bar linkage attached to the frame and a side washing brush attached to the four-bar linkage and having an axis of rotation being perpendicular to the direction of travel and perpendicular to the ground pathway. Because of the four-bar linkage the side washing brush travels in an elliptical path and has a longer contact time with passing vehicle parts providing a superior car wash due to the longer brush contact time. In addition, the elliptical path allows the side washing brush to operate in an area of space being less than that of a circular path (e.g. the path way provided by a single bar link).

In accordance with an added feature, the four-bar linkage is one of a plurality of four-bar linkages and the brush is one of a plurality of brushes each attached to the frame by one of the four-bar linkages.

In accordance with another feature of the invention, the four-bar link includes a first link attached to the frame, a second link having a first end pivotably attached to the first link and a second end, and a third link having a first end attached to the brush and a second end. The second end of the second link is pivotably attached to the third link between the first and second ends. A fourth link is provided and has a first end pivotably attached to the first link and a second end pivotably attached to the second end of the third link.

In accordance with a further feature of the invention, the second end of the fourth link does not extend past the third link.

In accordance with an additional feature of the invention, the first link is formed by the frame.

In accordance with yet another feature of the invention, the four-bar link is formed without any counterweights and therefore a more compact design is possible.

With the foregoing and other objects in view there is further provided, in accordance with the invention, a method of operating a side brush in an automated carwash. The method includes orienting an axis of rotation of the side brush perpendicular to a feed direction of a vehicle traversing the automated carwash and perpendicular to a floor of the automated carwash. The vehicle is engaged by the side brush for washing the vehicle, the side brush follows an elliptical path to and from and during engagement with the vehicle.

Other characteristic features of the invention are set forth in the appended claims.

Although the invention is illustrated and described herein as a rotating side brush with a four bar linkage for an automated carwash, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

DETAILED DESCRIPTION OF THE INVENTION

Figure 1:
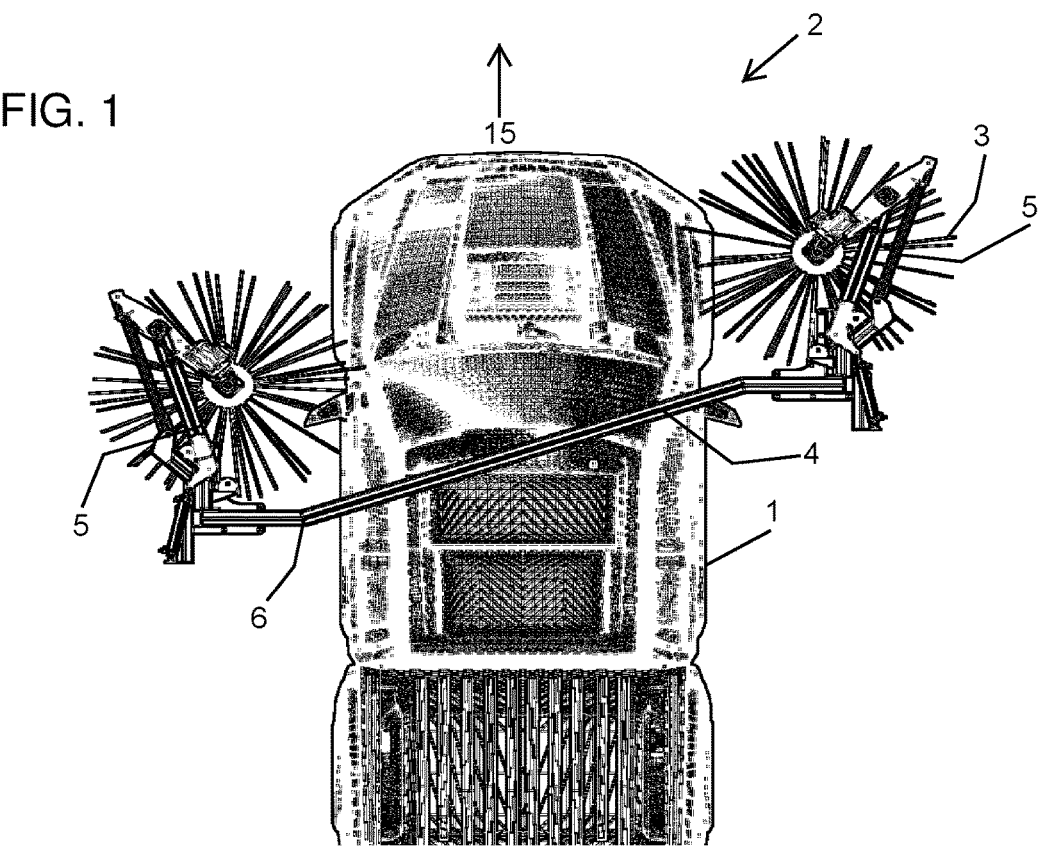
FIG. 1 is a diagrammatic, top view of a vehicle entering a carwash station according to the invention.

In all the figures of the drawing, sub-features and integral parts that correspond to one another bear the same reference symbol in each case.

Figure 2:
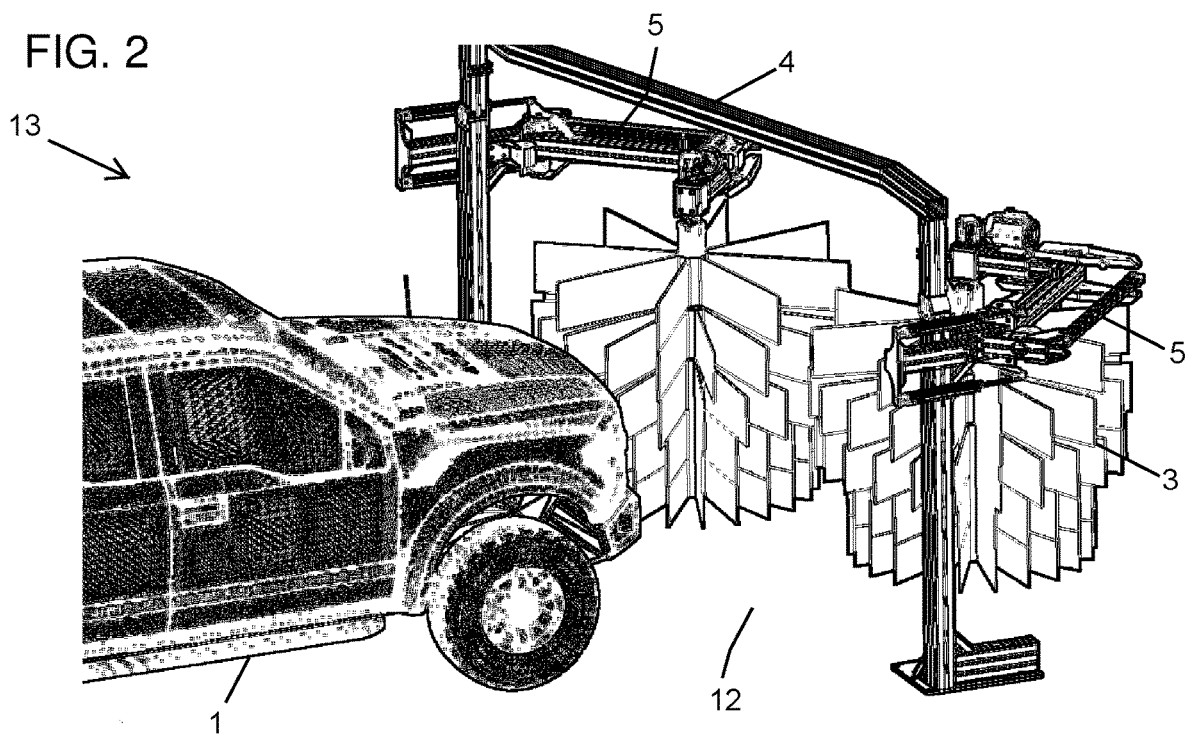
FIG. 2 is a perspective, side view of the vehicle upon initial entry into the carwash station.

Referring now to the figures of the drawings in detail and first, particularly to FIGS. 1 and 2 thereof, there is shown a vehicle 1 that is entering a carwash station 2 of a carwash 13 along a feed direction 15, also known as a direction of travel 15. The carwash station has a pair of side brushes 3 attached to frame 6 being a part of a carwash tunnel 4 for washing the front, side and rear portions of the vehicle 1. The carwash station 4 is supported on a ground pathway 12 of the carwash 13. A four-bar-linkage 5 attaches the side brushes 3 to the carwash tunnel 4. The invention regards the usage of the four-bar linkage 5 to support the rotating side brush 3 rather then a single bar linkage as is known in the prior art. The four-bar linkage 5 allows an axis of rotation to travel along an elliptical path rather than a radial path as is known from a single bar linkage.

As the rotating side brush 3 is pushed by the vehicle 1 it will pivot about multiple points simultaneously (e.g. the various pivot points of the four-bar linkage 5).

In the carwash industry, the use of four-bar linkages is already being done with horizontal rotating brushes whose axis of rotations are parallel to the ground and perpendicular to the feed direction. But, up until now, the mechanical concept has not been applied to rotating side brushes whose axis is perpendicular to the ground and perpendicular to the feed direction 15.

Figure 3:
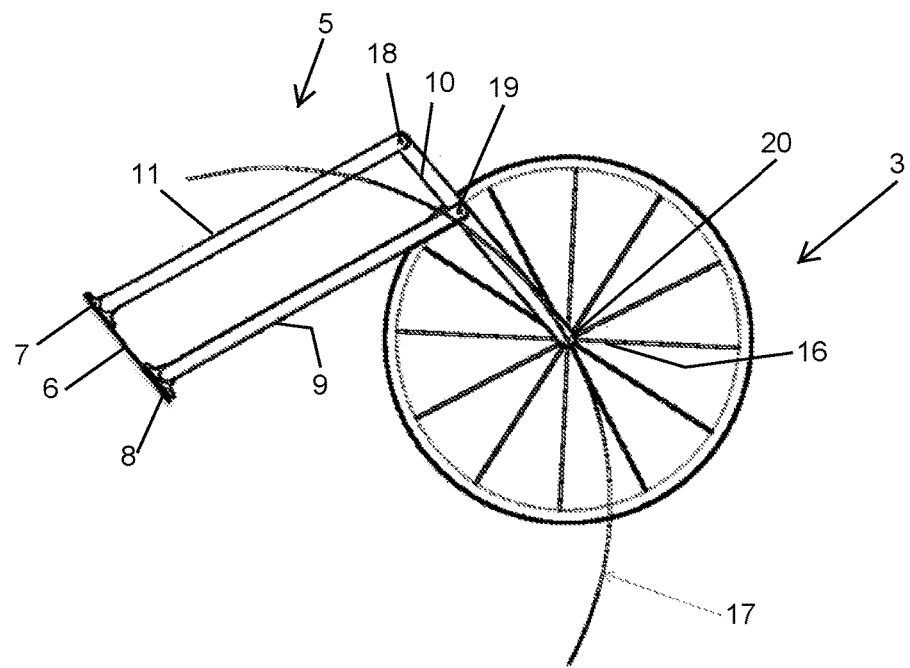
FIG. 3 is an illustration of a 4-bar link connected to a rotating side brush.
Figures 4A, 4B, 4C, 4D, 4E, 4F, 4G:
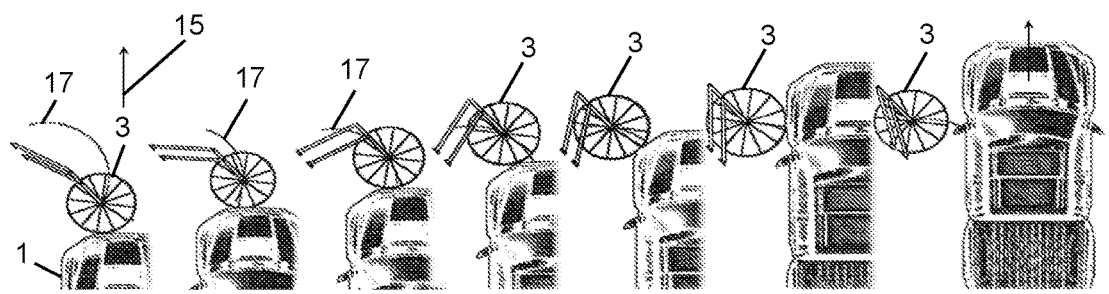
FIGS. 4A-4G are top plan views of the vehicle traversing by the rotating side brush.

FIG. 3 shows the four-bar link 5 attached to the brush 3. The four-bar link 5 has a first link 6 which is firmly attached to the carwash tunnel 4 (e.g. a frame or solid mount) and has two pivot points 7, 8. Therefore the first link 6 is a fixed link. A second link 9, also known as a main arm 9, pivots about the first pivot point 8 of the first link 6 and supports a third link 10. The second link 9 has a fixed length. A fourth link 11, also known as a tie rod 11, pivots about the secondary pivot point 7 of the first link 6 and supports the third link 10. The fourth link 11 also has a fixed length. At this point we note that the third link 10 is connected at two pivot points 18, 19 to the respective fourth link 11 and the second link 9. As seen best in FIG. 3, the third link 10 extends beyond the second link 9 and has an end point 20 which engages the brush 3 at its axis of rotation 16. In this manner, the third link 10 makes a unique travel path (e.g. an elliptical travel path 17) as it is effected by the four pivot points 7, 8, 18, 19.

The third link 10, also known as a secondary arm 10, pivots about an end of the fourth link 11 and an end of the second link 9 simultaneously. The main arm 9 provides the main support for the secondary arm 10, the tie rod 11 changes an orientation of the fourth link 11 with respect to second link 9.

The four-bar link 5 creates a unique motion path which has many benefits in the carwash industry which has not been recognized till now. First, the four-bar linkage 5 provides a smaller footprint inside the carwash and requires less space to operate (e.g. move). Second, due to the elliptical movement path 17 created by the four-bar link 5, the side brush 3 can be optimized to have more contact with designated parts of the vehicle 1 (e.g. longer wash contact time). Furthermore, the four-bar link 5 operates (e.g. holds the side brush 3) without the need for counterweights.

FIGS. 4A-4G show the motion of the brush 3 as the vehicle 1 travels in the feed direction 15 and how the brush 3 contacts the vehicle 1. From left to right in FIGS. 4A-4G, the brush 3 contacts a front of the vehicle 1, as the vehicle travels forward, the invention allows the brush 3 to stay in front of the car for a longer period of time, as the vehicle 1 continues to travel forward. An angle created between the main arm 9 and the secondary arm 10 goes from an acute angle to an obtuse angle. This change in motion creates the elliptical path 17 of the brush 3 which brings the rotation axis 16 of the brush 3 closer to the fixed pivot points 7, 8 (compare FIG. 4A to FIGS. 4E-4G). This path significantly reduces the footprint of the motion the brush 3 uses compared to a rotating brush that pivots only radially.

As the vehicle 1 has a longer duration of contact with the side brush 3, a superior carwash is provided.

Figure 5:
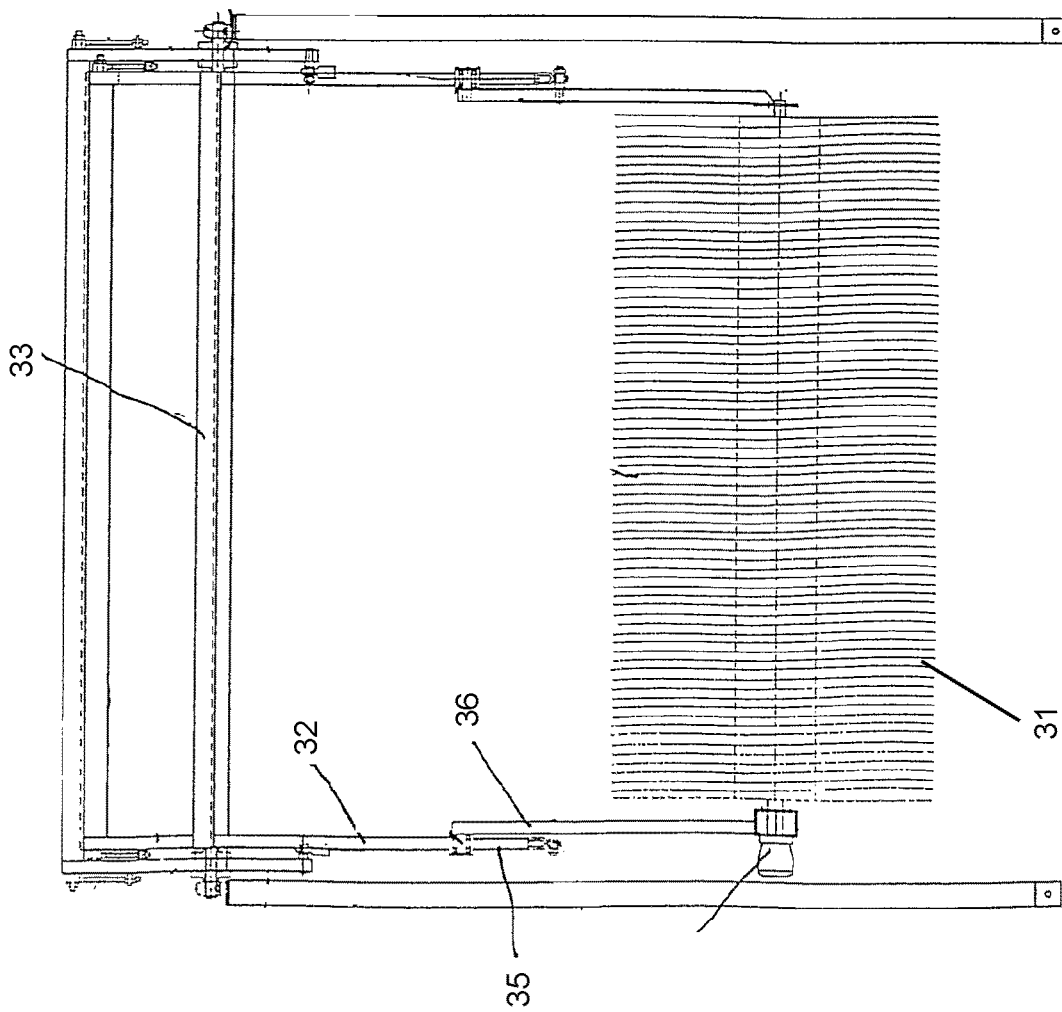
FIG. 5 is a front view of a four-bar link known in the prior art for a horizontally oriented brush.
Figure 6:
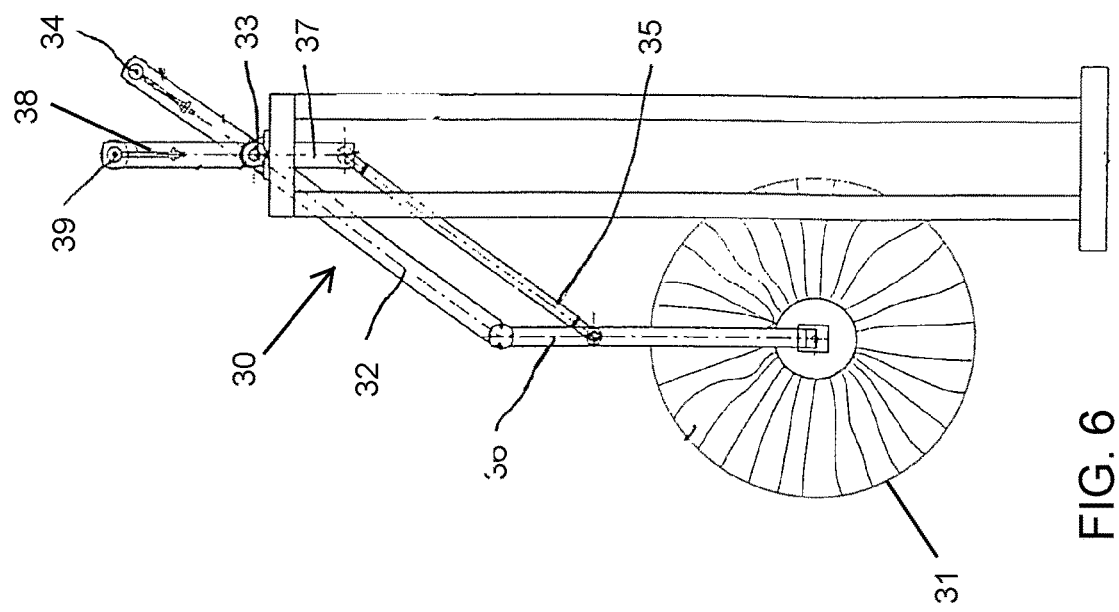
FIG. 6 is a side view of a four-bar link used in the prior art for the horizontally oriented brush.

FIGS. 5 and 6 are illustrations of a four-bar link 30 known in the prior art for carrying an overhead horizontal brush 31. The four-bar link 30 has a guide lever 32 connected to a frame 33. The guide lever 32 at one end has a first counter weight 34. Parallel to the guide lever 32 is a tie rod 35. The guide lever 32 and the tie rod 35 connect to a carry lever 36 which in turn has an end that connects to the horizontal brush 31. The fourth link is a lever arm 37 connected to the tie rod 35 and the guide lever 32 opposite to the carry lever 36. At one end 38 the lever arm 37 extends past the guide lever 32 and has a second counter weight 39. As can be seen in FIGS. 5 and 6 the four-bar links 30 in carwashes in the prior art require the use of the two counterweights 34, 39 resulting in an extended guide lever 32 and lever arm 37.

The invention claimed is:

1. A carwash station for receiving a vehicle being conveyed in a direction of travel in a carwash having a ground pathway, the carwash station comprising:
   a frame supported by the ground pathway;
   a four-bar linkage having pivot points and attached to said frame; and
   a side washing brush attached to said four-bar linkage, said four-bar linkage having an axis of rotation being perpendicular to the direction of travel and perpendicular to the ground pathway.

2. The carwash station according to claim 1, wherein:
   said four-bar linkage is one of a plurality of four-bar linkages; and
   said brush is one of a plurality of brushes each attached to said frame by one of said four-bar linkages.

3. The carwash station according to claim 1, wherein said four-bar linkage includes:
   a first link attached to said frame;
   a second link having a first end pivotably attached to said first link and a second end;
   a third link having a first end attached to said brush and a second end, said second end of said second link pivotably attached to said third link between said first and second ends; and
   a fourth link having a first end pivotably attached to said first link and a second end pivotably attached to said second end of said third link.

4. The carwash station according to claim 3, wherein said second end of said fourth link does not extend past said third link.

5. The carwash station according to claim 3, wherein said first link is formed by said frame.

6. The carwash station according to claim 3, wherein said four-bar linkage is formed without any counterweights.

7. The carwash station according to claim 3, wherein said side washing brush follows an elliptical path due to said pivot points of said four-bar linkage.

8. The carwash station according to claim 1, wherein said four-bar linkage is disposed parallel to the ground pathway.

9. The carwash station according to claim 1, wherein said side brush follows an elliptical path to and from and during engagement with the vehicle.

10. The carwash station according to claim 1, wherein said four-bar linkage has four axes of rotation each being perpendicular to the direction of travel and perpendicular to the ground pathway.

* * * * *